United States Patent [19]
Merrett

[11] Patent Number: 5,984,375
[45] Date of Patent: Nov. 16, 1999

[54] HOSE COLLAR AND METHOD OF USE THEREFOR

[75] Inventor: Stanley Leo Merrett, Dadeville, Ala.

[73] Assignee: Schlumberger Industries, Inc., Norcross, Ga.

[21] Appl. No.: 08/898,782

[22] Filed: Jul. 23, 1997

[51] Int. Cl.[6] ................................................ F16L 33/23
[52] U.S. Cl. ...................... 285/253; 285/903; 29/890.144
[58] Field of Search ..................... 285/253, 903, 285/371, 398, 226, 373, 419, 906, 243; 138/109, 121, 122; 29/890.144

[56] References Cited

U.S. PATENT DOCUMENTS

| 237,324 | 2/1881 | Reynolds | 285/253 |
|---|---|---|---|
| 926,532 | 6/1909 | Wilson | 285/903 X |
| 3,239,254 | 3/1966 | Campbell | 285/903 X |
| 4,400,022 | 8/1983 | Wright | 285/903 X |
| 4,411,460 | 10/1983 | Beal | 285/243 |
| 4,711,974 | 12/1987 | Borsh | 285/903 X |
| 5,178,421 | 1/1993 | Tressler | 285/243 X |
| 5,277,459 | 1/1994 | Braun et al. | 285/903 X |
| 5,458,380 | 10/1995 | Kanao | 285/903 X |
| 5,738,385 | 4/1998 | Homann et al. | 285/903 X |

FOREIGN PATENT DOCUMENTS

| 870480 | 5/1971 | Canada | 285/253 |
|---|---|---|---|
| 229988 | 9/1990 | Japan | 285/903 |
| 215225 | 5/1924 | United Kingdom | 285/253 |
| 2064694 | 6/1981 | United Kingdom | 285/903 |

*Primary Examiner*—Dave W. Arola
*Attorney, Agent, or Firm*—Leonard Pojunas

[57] ABSTRACT

A hose coupling assembly utilizes first and second hose collar halves interacting with a barbed connector for mounting to a PVC spiral hose with screws. The collar halves are identical and may be molded from flexible plastic material for ease of attachment to the spiral hose.

18 Claims, 3 Drawing Sheets

HOSE TRAY

HOSE TRAY  16  10

HOSE COLLAR AND METHOD OF USE THEREFOR

TECHNICAL FIELD

The present invention relates to a split hose coupling and method of use therefor. More particularly, the invention relates to a split hose coupling for use with undulating hoses, such as spiral helix polyvinyl chloride hoses.

BACKGROUND ART

Flexible polyvinyl chloride (PVC) suction hoses having outside diameters formed with a spiral helix and a smooth inner bore are widely used, for example, in the fire industry, for trash pumps, in construction mining, for solid material transfer and liquid manure pumping. These flexible PVC hoses typically have outside diameters between 1½" to 6" and because of their non-uniform, spiraled helix shape, are difficult to seal and connect to a source of pressure such as a fire hydrant.

Typically, to connect the hose to a fire hydrant, a connector having a first end with a barbed shank is inserted within the smooth inner bore of the hose. A second end of the connector extends outward from the hose for coupling to the fire hydrant.

To seal the hose to the barbed shank, a pair of metal (e.g. aluminum) hose collars surround the hose and are generally coextensive with the barbed shank. The hose collars are tightened together and compress the hose onto the barbed shank. In this manner, a seal is formed between the hose and the connector wherein the hose collar prevents the movement of the hose relative to the connector.

The difficulties encountered with currently available hose collars formed from aluminum are numerous. One difficulty is that leaks occur between the hose and barbed shank because the hose is frequently "pinched" when the hose collars compress the hose. Pinching causes air to be sucked into the hose during drafting causing pump cavitation and loss of prime. Pinching occurs because the hose collars have an inside diameter less than or equal to the outside diameter of the hose so that as the hose is compressed by the hose collars, a portion of the hose is deformed into an area between the parting faces of the hose collars, thus causing a leak. Variations in the outside diameter of the hose can exacerbate this problem.

Another difficulty is that current aluminum hose collars require parts made from two separate castings. These castings are rigid and provide no means of flexing to allow for proper fit, resulting in pinching between the parting faces. The leakage caused by the pinching prevents the ability to draft.

When not in use, hose collar assemblies are frequently mounted on hose trays. As depicted in FIG. 6A, current aluminum hose assemblies hang off the hose tray and are subject to damaging the hose due to excessive bending and chafing of the hose collar assembly.

SUMMARY OF THE INVENTION

It is, therefore, an object of the present invention to eliminate or avoid the above mentioned problems.

It is an object of the present invention to provide a hose collar usable with a spiral or ridged hose which produce a good seal between the hose and a barbed connector.

It is yet another object of the present invention to provide a hose collar in which the two halves of the hose collar are identical.

It is a further object of the present invention to provide a hose collar which is made from a plastic material and is flexible so as to prevent pinching when assembled.

Still another object of the present invention to provide a hose collar which is light, economical to manufacture, and reliable in operation.

These and other objects of the invention are achieved by providing a hose collar for coupling a hose having an undulating outside diameter to a connector. The hose collar includes a first hose collar half and a second hose collar half, each having a semi-circular recess and opposed parting faces adjacent said recesses. Fasteners are provided for securing the first and second hose collar halves to each other. Each of the recesses receiving a portion of the undulating outside diameter of the hose has a surface mating with the undulating outside diameter of the hose.

These and other objects are also achieved by a method of sealing a hose having an undulating outside diameter to a connector. The method includes the steps of inserting a portion of a connector into an outside diameter of the hose. A pair of flexible hose collars are placed over the undulating outside diameter of the hose concentric to the portion of the connector. Hose collars are tightened over the outside onto the undulating outside diameter of the hose such that the undulating hose is not deformed between parting faces of the hose collar.

Still other objects and advantages of the present invention will become readily apparent to those skilled in the art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

For a more complete understanding of the present invention and advantages thereof, reference is now made to the following description taken in conjunction with the accompanying drawings wherein like reference numbers indicate like features throughout the figures and wherein.

BEST MODE FOR CARRYING OUT THE INVENTION

Figure 1:
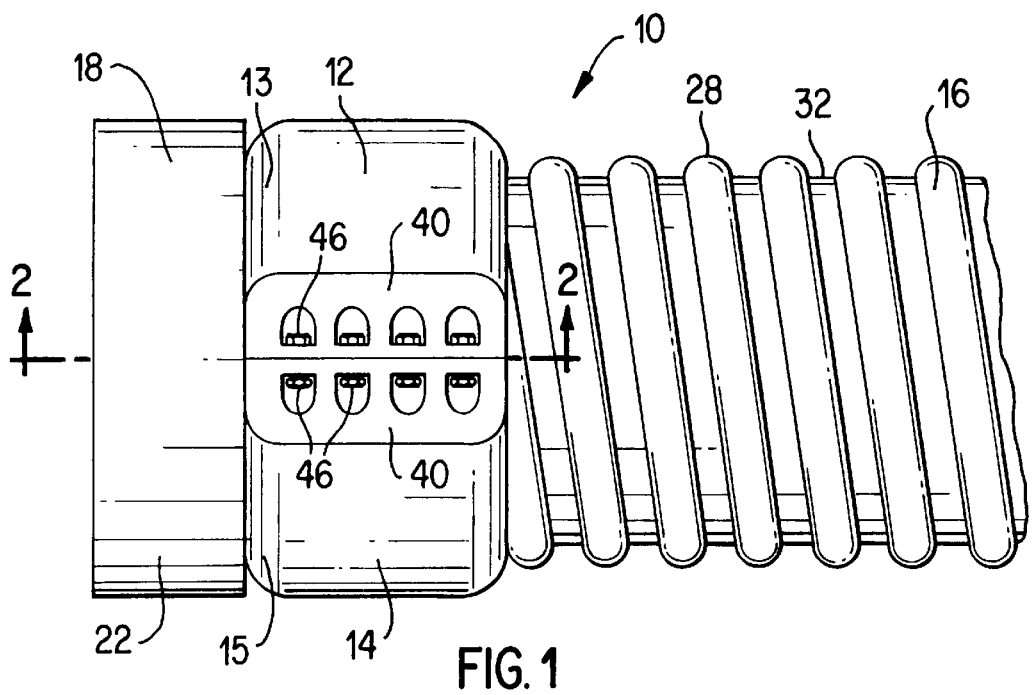
FIG. 1 is a side elevational view of a hose collar assembly according to the present invention, depicting the hose collar tightened over the hose.

Refer now to FIG. 1 where a hose coupling assembly 10 is illustrated which is constructed in accordance with the principles of the present invention. Typically, two hose coupling assemblies 10 would be used, one for each end of the hose 16. For simplicity, only one end of the hose 16 is described herein. The hose coupling assembly 10 includes a first hose collar half 12 and a second hose collar half 14 mounted to a PVC spiral hose 16, and a barbed connector 18. As described herein, the preferred embodiment of the hose coupling assembly 10 would typically be used in water delivery systems, such as coupled to a fire hydrant, although it is envisioned that the invention would be equally advantageous when used in any environment where a spiraled hose needs to be coupled to a source of pressure.

Figure 2:
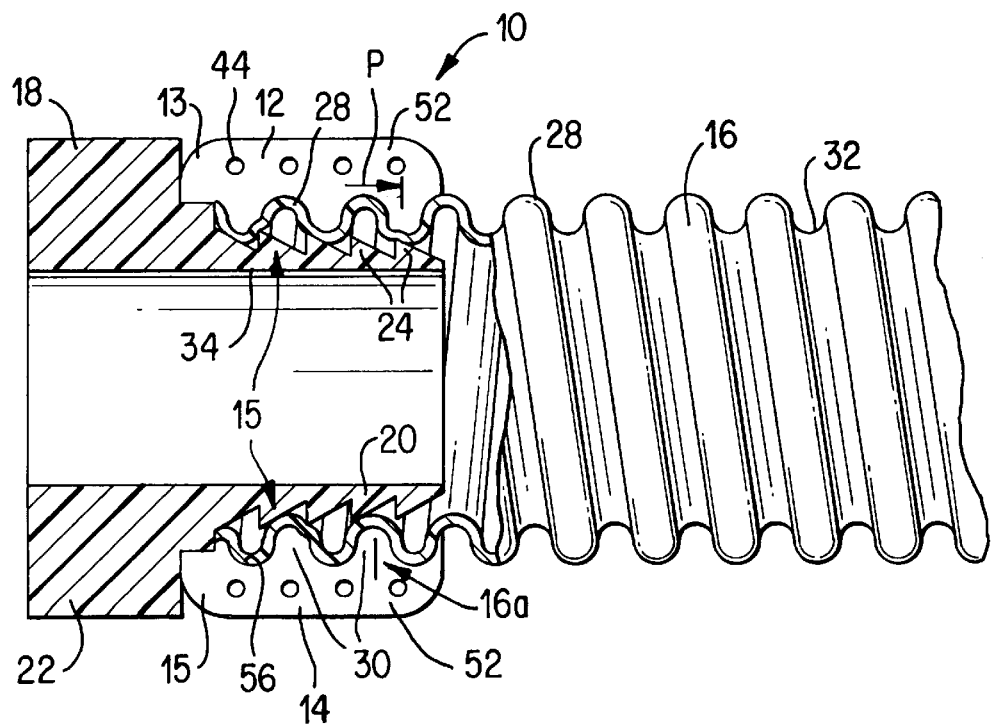
FIG. 2 is a sectional view partially in side elevation, taken along line 2—2, of the hose collar assembly of FIG. 1.

For convenience, the invention will be described in relation to the orientations depicted in FIGS. 1 and 2, and consequently, terms such as "above," "below," "left" and "right" as used herein are to be construed in the relative sense.

First hose collar half 12 and second hose collar half 14 are preferably and identical and are formed from a flexible plastic material. Advantageously, because first hose collar half 12 and second hose collar half 14 are identical, only one mold need be made for producing the hose collar halves from an injection-molded plastic material. Each hose collar half 12, 14 has a semi-cylindrical exterior shape and a recess 15 (FIG. 2) for receiving an undulating outside end portion 16a of hose 16. Hose 16 is typically formed in 10' lengths, although any length hose can be used. Connector 18 has a barbed hose receiving end 20 (depicted in FIG. 2) and a coupling end 22. A plurality of barbed segments 24 are formed on an outer diameter of hose receiving end 20. Each barbed segment 24 has a larger outer diameter at one end thereof and gradually decreases in a direction towards a distal end of barbed end 20. Hose collar halves 12, 14 have ends 13, 15 at left ends thereof in close proximity or in contact with coupling end 22.

Hose 16 has an outside diameter defined by the radially outwardmost extent of a raised rib 28 which spirals from one end of the hose to the other end and projects radially outwardly from a jacket 32 of the hose. In cross-section, as depicted in FIG. 2, raised rib 28 has approximately a semi-circular shape. Hose 16 has a smooth inner diameter 34.

Figure 3:
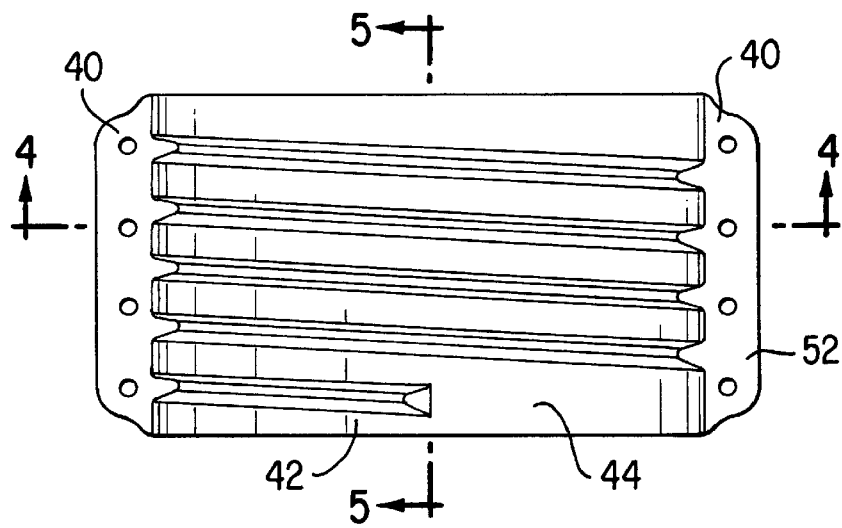
FIG. 3 is a plan view of the hose collar of FIGS. 1 and 2, depicting the interior recess.
Figure 4:
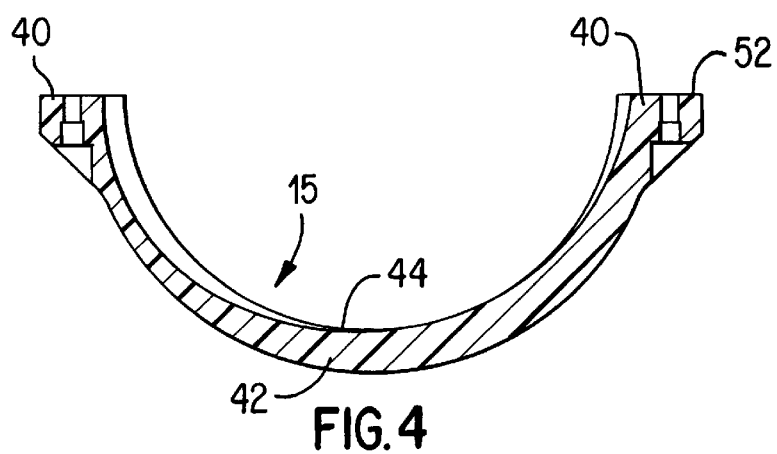
FIG. 4 is a sectional view of the hose collar taken along line 4—4 of FIG. 3.
Figure 5:
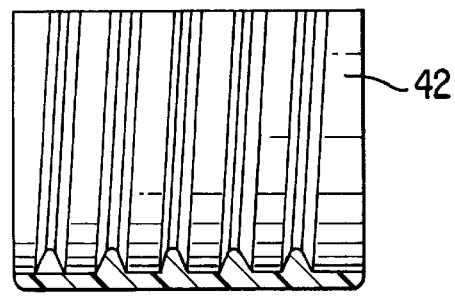
FIG. 5 is an enlarged cross-sectional view of the spaced ribs taken along line 5—5 of FIG. 3.

Hose collar halves 12, 14 each have a pair of flanges 40, joined together by a curved section 42 as depicted in FIGS. 3, 4 and 5. It should be understood that the description of the hose collar is the same for both because both are identical. First hose collar half 12 and second hose collar half 14 are joined together via holes 44, through which bolts 46 extend. As depicted in FIG. 1, flanges 40 have four bolts 46, although any number preferably above two may be used.

Each hose collar half 12, 14 has the semi-circular recess 15 therein between flanges 40. Parting faces 52 are formed on each flange 40. The inside diameter of recess 15 in each hose collar half 12, 14 as defined by the radially inwardmost extent of ribs 30 is smaller than the outside diameter of hose 16 as defined by the radially outwardmost extent of rib 28. Each recess 15 has a series of the longitudinally spaced helical ribs 30 which extend between parting faces 52. Spaces 56 are formed between helical rounded ribs 30. Ribs 30 have a pitch P such that for each 180° of revolution, each rib advances axially a distance equal to the spacings between each of the ribs 28 of hose 16. Ribs 30 and spaces 56 are formed to have a mating contour with the outer surface of hose 16 defined by hose ribs 28 and jacket 32.

Hose collar halves 12, 14 are preferably designed to directly contact each other at their parting faces 52 when sufficiently tightened upon the hose with bolts 46. Ribs 30 are brought into clamping contact with jacket 32 and spaces 56 receive helical ribs 128. Advantageously, the plastic material used for hose collar halves 12, 14 is flexible and flexes around raised rib 28 providing a uniform compression of the hose. This uniform compression prevents the hose from being displaced or deformed between the parting faces 52 which would otherwise cause the hose to be pinched or sheared, thus causing a leak.

By contrast, hose collars made from aluminum are rigid and do not permit the spiral hose to flex. Thus, when aluminum hose collars are tightened on the hose, material is displaced causing the hose to be pinched or sheared at the parting faces, thus causing leaks. The rigidity of the aluminum hose collars results in a non-uniform compression around the hose also resulting in leaks.

In assembling the hose coupling assembly 10, the barbed connector end 34 of connector 18 is slid into the hose 16. Hose collar halves 12, 14 are then placed around hose 16 in radially adjacent relation to connector end 34, and the bolts 46 are tightened. As the bolts 46 are tightened, the hose 16 will conform to the shape of the recesses 50 and the inner diameter 34 of hose 16 will conform to the shape of barbed end 20 of connector 18. The compression on hose 16 by hose collar halves 12, 14 creates a tight seal between hose 16 and connector 18.

Figure 6A:
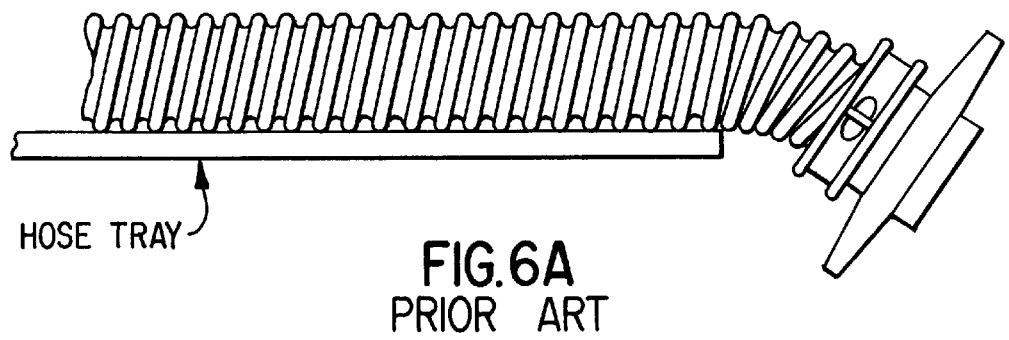
FIG. 6A is a side elevational view of a prior art hose collar assembly on a hose tray.
Figure 6B:
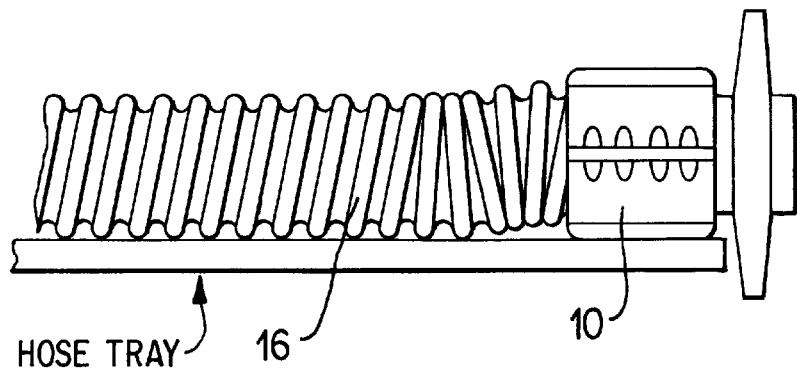
FIG. 6B is a side elevational view of the hose collar assembly of the present invention on a hose tray.

Hose coupling assembly 10, as depicted in FIG. 6B has relatively long hose collar halves 12, 14 enabling the hose collar 10 to ride in the hose tray on the side of a fire truck. Advantageously, this long profile (as opposed to the short profile depicted in the prior art in FIG. 6A) prevents damage to the hose 16 due to bending and chafing by allowing hose collar assembly to ride in the hose tray rather than droop off as is common with currently available hose collars.

It should now be apparent from the foregoing detailed description that a hose collar has been described that can advantageously be placed around a spiral hose and form a liquid tight seal. It should also be apparent that a hose collar assembly has been described which can advantageously be made from a single mold and have identical halves. It should also be readily apparent that a unique flexible design has been described that allows uniform clamping force 360° around the hose. Also this design is flexible and prevents pinching which causes leaks.

It will be readily seen by one of ordinary skill in the art that the present invention fulfills all the objects set forth above. After reading the foregoing specification, one of ordinary skill in the art will be able to affect various changes, substitutions of equivalents and various other aspects of the invention as broadly disclosed herein. It is, therefore, intended that the protection granted hereon be limited only by the definition contained in the appended claims and equivalents thereof.

What is claimed is:

1. A hose collar for coupling a hose having an undulating outside diameter to a connector, the hose collar comprising:

a first hose collar half and a second hose collar half each having a semi-circular recess and opposed parting faces adjacent said recesses;

fasteners connected to secure said first and second collar halves to each other;

each of said recesses receiving a portion of the undulating outside diameter of the hose and having a surface mating with the undulating outside diameter of the hose, wherein each said surface of said recess has inwardly directed longitudinally spaced ribs that grip a correspondingly shaped outside diameter of the hose, wherein said first and second collar halves are made of a flexible material to enable said halves to flex around corresponding ribs on said hose in cooperation with the connector extending inside the base in opposing relationship to said halves to provide uniform compression of said halves against said hose and to seal said hose against said connector and to prevent pinching of the hose between said parting forces of said first and second collar halves.

2. The hose collar of claim 1, wherein said ribs are generally in the form of a single helical lead thread.

3. The hose collar of claim 1, wherein said first hose collar half and said second hose collar half are identical.

4. The hose collar of claim 1, wherein said ribs have rounded surfaces.

5. The hose collar of claim 1, wherein the hose has a smooth interior diameter.

6. The hose collar of claim 1, wherein the hose has a spiral outside diameter.

7. The hose collar of claim 1, wherein the hose is a ribbed conduit.

8. The hose collar of claim 1, wherein the connector is a barbed connector.

9. The hose collar of claim 1, wherein said parting faces are brought into contact by said securing means.

10. The hose collar of claim 1, wherein the connector has a hose coupling end and a hose receiving end, said first hose collar half and said second collar half each overlapping at least a portion of said hose receiving end, said first hose collar half and said second hose collar half each having one end thereof in close proximity to the hose coupling end of the connector.

11. The hose collar of claim 1, wherein said halves are made of plastic material.

12. The hose collar of claim 1, wherein said halves are made of polymer material.

13. A method of sealing a hose having an undulating outside diameter to a connector, comprising the steps of:

inserting a portion of a connector into an inside diameter of the hose;

placing a pair of flexible plastic hose collars over the undulating outside diameter of the hose concentric to the portion of the connector, each collar having inwardly directed longitudinally spaced ribs that grip a correspondingly shaped outside diameter of the hose;

tightening the hose collars onto the undulating outside diameter of the hose to flex around corresponding ribs on said hose in cooperation with the connector extending inside the base in opposing relationship to said halves to provide uniform compression of said halves against said hose and to seal said hose against said connector and to prevent pinching of the hose between parting forces of said first and second collar halves.

14. The method of claim 13, wherein each of the hose clamps has a recess having a surface which mates with the undulating outside diameter of the hose.

15. The method of claim 13, wherein the connector is a barbed connector.

16. The method of claim 13, wherein the hose has a spiral outside diameter.

17. The method of claim 13, wherein the hose is a ribbed conduit.

18. The method of claim 13, wherein said hose collars are clamped to a hose used in combination with a fire hydrant and pump as a component of a pumping water delivery system.

* * * * *